(No Model.)
E. LUHMANN.
MEASURING APPARATUS FOR LIQUID CARBONIC ACID.
No. 327,448. Patented Sept. 29, 1885.
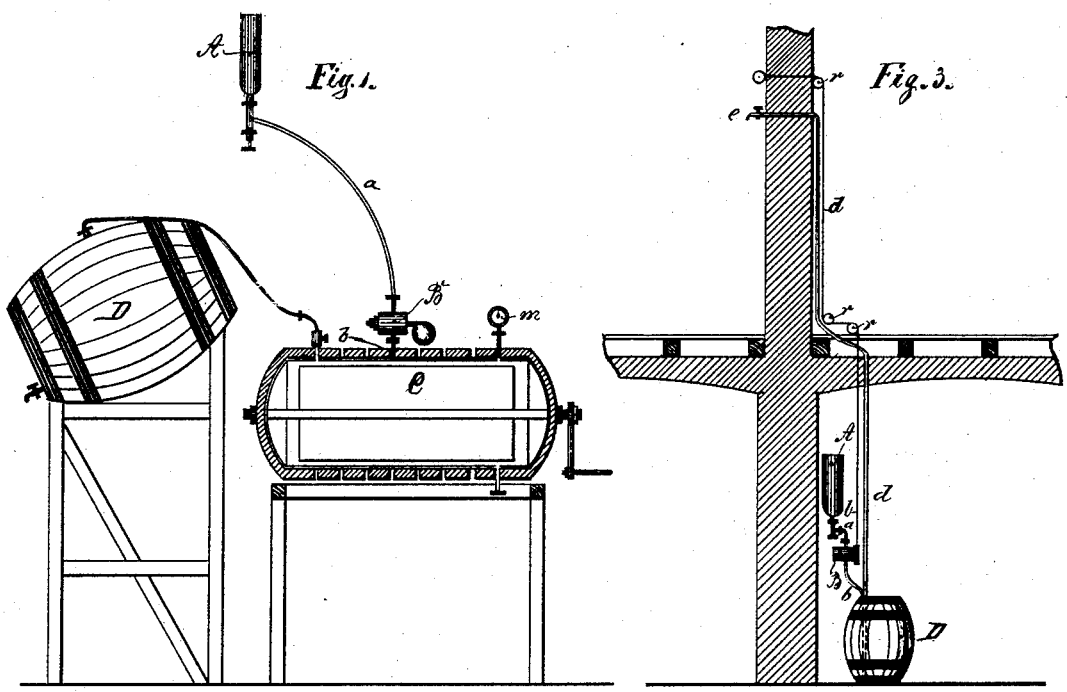
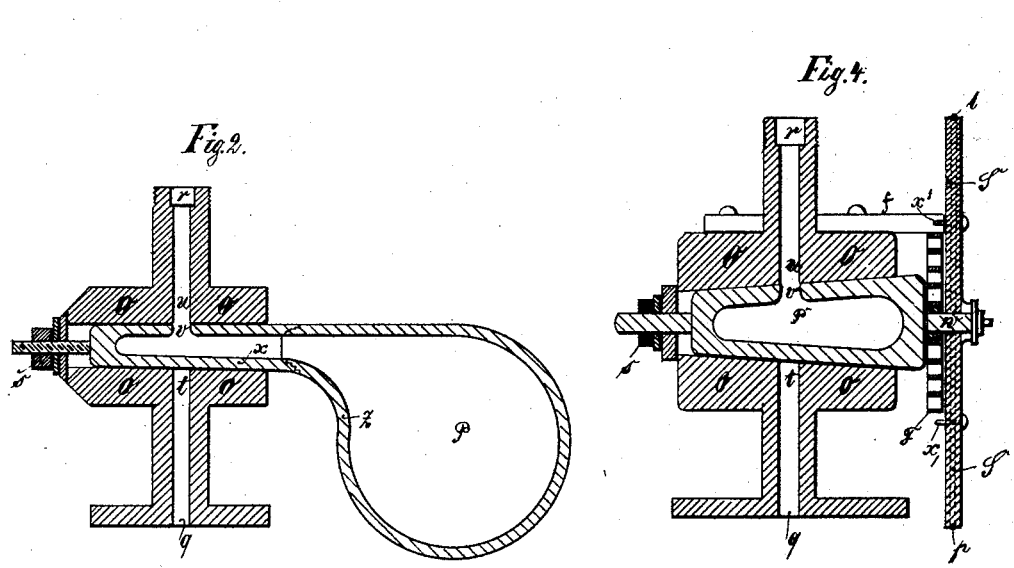
Witnesses:
Carl Karp
Martin Petry
Inventor
Eduard Luhmann
by Goepel & Raegener
Attorneys.

UNITED STATES PATENT OFFICE.

EDUARD LUHMANN, OF ROGASEN, PRUSSIA, GERMANY.

MEASURING APPARATUS FOR LIQUID CARBONIC ACID.

SPECIFICATION forming part of Letters Patent No. 327,448, dated September 29, 1885.

Application filed August 11, 1884. (No model.) Patented in England July 22, 1884, No. 10,437; in Belgium August 16, 1884, No. 65,858; in Germany September 19, 1884, No. 29,678; in France February 2, 1885, No. 165,083, and in Spain March 20, 1885, No. 6,635.

*To all whom it may concern:*

Be it known that I, Dr. EDUARD LUHMANN, of the city of Rogasen, Prussia, Germany, and a subject of the King of Prussia, have invented certain new and useful Improvements in Measuring Apparatus for Liquid Carbonic Acid, of which the following is a specification.

My invention relates to improvements in an apparatus for dispensing liquefied gases in measured quantities; and it consists of a hollow stop-cock of peculiar construction, which serves as a measuring-vessel, and which is connected to the receiver and the delivery-vessel, and by which communication is established either with the receiver or with the delivery-vessel, or entirely interrupted, together with the means for operating said cock, as hereinafter more fully described.

In the accompanying drawings, Figure 1 is an elevation of my improved apparatus, showing the vessel containing the liquid to be aerated in section; Fig. 2, a detail section of the measuring apparatus; Fig. 3, an elevation of the apparatus shown as applied for raising beer or other liquids, and Fig. 4 a detail section of a modified form of the measuring apparatus.

Similar letters of reference indicate corresponding parts.

A is a receiver, containing liquid carbonic acid, or any other gas liquefied at high pressure. B is a measuring apparatus, and C a vessel to which the carbonic acid is to be supplied in accurately-measured quantities.

*a* is a pipe connecting the receiver A with the measuring apparatus B, and *b* a pipe connecting the latter and the vessel C, which must be provided with a valve or stop-cock. The receiver A is of the kind generally used for supplying liquid carbonic acid to the trade. It is supported with its mouth downward, so that only liquid acid shall pass out, while the space above the liquid is filled with carbonic-acid gas.

The delivery-vessel C (shown in Fig. 1) is of the usual construction of vessels for aerating liquids. *m* is a manometer attached to the same.

The measuring-vessel B, which is shown in section and on a larger scale in Fig. 2, is in substance a stop-cock, of which O is the body or casing, and P the plug. *r* and *q* are tubular extensions, by which the measuring apparatus is connected with the pipes *a* and *b*, respectively. *u* and *t* are the passages for the liquid to and from the plug.

The plug P is made hollow, and not perforated like the plugs of ordinary stop-cocks for a passage through the same, but is provided with but one opening, *v*. The plug is made large enough to hold the desired quantity of liquid acid. The hollow plug P has a bulb-shaped enlargement, *z*, at the end of the tapering end *x* in the casing O. The tapering part *x* and bulb *z* are screwed together and then soldered at the joint, the part *x* forming the plug proper, while the part *z* is added for the purpose of increasing the aggregate capacity of the measuring-vessel, the plug proper being necessarily of small dimensions. *s* is a nut for holding the plug in position in the usual manner.

The construction of the measuring apparatus may be varied, and the plug may have more than one opening. It must be so arranged, however, that in one position the interior of the plug communicates with the retaining-vessel, shutting off all other communication, while in the second position it closes all communication, while in a third position it communicates only with the receiving-vessel or with the place of delivery.

When but very small quantities of liquid are to be measured out at one operation, the plug is not enlarged, but is by preference made as shown in Fig. 4.

When desired, the vessel C may be used for washing the gas or as a pressure-regulator, from which it passes to a keg or other vessel, D, as shown in Fig. 1.

The operation of the apparatus is as follows: The plug P being in the position shown in Fig. 2, the stop-valve of the receiver A is opened, allowing the liquid acid from the same to pass through the pipe *a*, passage *u*, and opening *v* into the plug P, so as to fill the latter with liquid. The plug is then turned through an angle of ninety degrees, whereby communication with the receiver A is closed. By turning the plug another ninety degrees the opening *v* is brought over the passage *t*, thus connecting the interior of the plug P with the vessel C. By alternately turning the plug P so as to open or close the connection with the vessel C, or by so turning the plug P that part only of the opening $v$ passes over the passage $t$, the discharge is regulated as desired, and thereby a measured quantity of the liquid carbonic acid is transferred from the receiver to the place of use.

When small quantities of carbonic acid are to be supplied at intervals of time to a beer-cask for aerating and raising it, the measuring apparatus shown in Fig. 4 is connected to a keg, D, as shown in Fig. 3. The keg D is connected by a pipe with the place where the contents of the keg are to be drawn off, and $e$ is the faucet for dispensing the same. $r\ r\ r$ are small guide-pulleys, and $l$ a cord which passes over the same, and is connected at one end by a fastening-pin, $p$, with a pulley, $s$, attached to the shank $w$ of the plug P. The other end of the cord is located near the faucet $e$, and is provided with a ring or handle for pulling it. As shown in Fig. 4, the plug P has a shank, $w$, upon which is secured the inner end of a spiral spring, F, the outer end being secured to a fixed bracket-arm, $f$. S is a grooved pulley, which is mounted upon the outer end of the shank $w$, and which has two projecting pins, $x$ and $x'$, so located that when, by pulling the cord $l$, communication is established by the receiver A and the measuring-plug P, one of said pins strikes against the bracket-arm $f$, while the tension on the cord is relaxed, the disk S is turned back by the spring F, so that the other pin $x$ strikes against the arm $f$, whereby communication between the plug P and key D is established.

Having thus described my invention, I claim as new and desire to secure by Letters Patent—

1. A measuring apparatus for liquefied gases, consisting of a hollow plug, P, having admission-opening $v$, in combination with a guide-casing, O, having a supply-opening, $u$, and a discharge-opening, $t$, in line with the opening of the plug, and means for causing said plug P to automatically turn on its axis, so that the admission-opening $v$ shall register normally with the supply-opening $u$, substantially as described.

2. A measuring apparatus for liquefied gases, consisting of a hollow plug, P, having admission-opening $v$, in combination with a guide-casing, O, having a supply-opening, $u$, and a discharge-opening, $t$, in line with the opening of the plug, and the spring F, for causing said plug P to automatically turn on its axis, so that the admission-opening $v$ shall register normally with the supply-opening $u$, substantially as described.

3. A measuring apparatus for liquefied gases, consisting of a hollow plug, P, having admission-opening $v$, in combination with a guide-casing, O, having a supply-opening, $u$, and a discharge-opening, $t$, in line with the opening of the plug, a bracket-arm, $f$, attached to said casing, a disk, S, mounted on an axial extension, $w$, of said plug, pins $x$ and $x'$ in said disk, adapted to strike said bracket-arm $f$, and limit the axial movement of said disk and plug, and the spring F, for causing said plug P to automatically turn on its axis, so that the admission-opening $v$ shall register normally with the supply-opening $u$, substantially as described.

4. A measuring apparatus for liquefied gases, consisting of a hollow plug, P, having admission-opening $v$, in combination with a guide-casing, O, having a supply-opening, $u$, and a discharge-opening, $t$, in line with the opening of the plug, a bracket-arm, $f$, attached to said casing, a grooved pulley, S, mounted on an axial extension, $w$, of said plug, pins $x$ and $x'$ in said pulley, adapted to strike said bracket-arm $f$, and limit the axial movement of said pulley and plug, the spring F, for causing said plug P to automatically turn on its axis, so that the admission-opening $v$ shall register normally with the supply-opening $u$, and the cord $l$, wound on said pulley in a direction the reverse of the force of said spring, for turning said plug in the opposite direction to permit the discharge of its contents, substantially as described.

In testimony that I claim the foregoing as my invention I have signed my name in presence of two subscribing witnesses.

EDUARD LUHMANN.

Witnesses:
ADOLPH ZEIJER,
B. ROI.